United States Patent
Brown, Jr.

(10) Patent No.: US 12,329,127 B2
(45) Date of Patent: Jun. 17, 2025

(54) PET TRAINING AND WELLNESS DEVICE AND PROCESS FOR MAKING THE SAME

(71) Applicant: George Brown, Jr., Maywood, IL (US)

(72) Inventor: George Brown, Jr., Maywood, IL (US)

( * ) Notice: Subject to any disclaimer, the term of this patent is extended or adjusted under 35 U.S.C. 154(b) by 15 days.

(21) Appl. No.: 18/173,953

(22) Filed: Feb. 24, 2023

(65) Prior Publication Data
US 2024/0284872 A1 Aug. 29, 2024

(51) Int. Cl.
*A01K 25/00* (2006.01)

(52) U.S. Cl.
CPC .................. *A01K 25/00* (2013.01)

(58) Field of Classification Search
CPC ..... A63B 23/025; A63B 23/03; A63B 23/032; A01K 25/00; A01K 19/00; A01K 27/00; A01K 27/002; A01K 15/00; A01K 13/00; B68B 1/06; A61D 15/00
See application file for complete search history.

(56) References Cited

U.S. PATENT DOCUMENTS

| | | | |
|---|---|---|---|
| 453,932 A | 6/1891 | Lynch | |
| D468,490 S | 1/2003 | Childs | |
| 6,832,581 B1 | 12/2004 | Vaugn | |
| 9,656,114 B1 * | 5/2017 | Hafeez-Bey | A63B 23/03 |
| 10,046,199 B2 * | 8/2018 | Lee | A63B 23/03 |
| 2004/0158200 A1 | 8/2004 | Berry | |
| 2005/0192157 A1 * | 9/2005 | Norton | A63B 23/03 |
| | | | 482/11 |
| 2011/0011353 A1 | 1/2011 | Stokes | |
| 2011/0030704 A1 | 2/2011 | Hanna | |
| 2011/0086321 A1 | 4/2011 | Finnegan et al. | |
| 2012/0283069 A1 * | 11/2012 | Martin | 482/11 |
| 2015/0282915 A1 | 10/2015 | Maro | |
| 2016/0256313 A1 * | 9/2016 | Smith | A61F 5/56 |
| 2020/0215384 A1 * | 7/2020 | Farrell | A63B 23/03 |
| 2022/0088438 A1 * | 3/2022 | Zafar | A63B 23/18 |

FOREIGN PATENT DOCUMENTS

WO  WO-2015/043434 A1  4/2015

* cited by examiner

*Primary Examiner* — Joshua J Michener
*Assistant Examiner* — Henry Hooper Mudd
(74) *Attorney, Agent, or Firm* — Foley & Lardner LLP (57) ABSTRACT

A pet wellness and training device intended to be worn inside an animal's mouth, and a method for manufacturing the same. More specifically, the pet wellness and training device comprises: an upper barrier configured to be disposed at least partially adjacent to a roof of the animal's mouth, a lower barrier configured to be disposed at least partially adjacent to a floor of the animal's mouth, a frame disposed between and connecting the upper barrier and the lower barrier, a breathable barrier extending between at least a portion of the upper barrier and at least a portion of the lower barrier, and at least one expansion member configured to urge the upper barrier and the lower barrier away from each other. In some embodiments, the upper and lower barrier may be integrally formed as one piece, configured to fit securely inside the animal's mouth.

18 Claims, 7 Drawing Sheets

PET TRAINING AND WELLNESS DEVICE AND PROCESS FOR MAKING THE SAME

TECHNICAL FIELD

The present disclosure relates generally to animal wellness and training devices, and more particularly, to a device configured to fit inside the mouth of an animal to prevent the animal from ingesting dangerous or foreign substances, to prevent the animal from biting other creatures or objects, and to reduce any resistance or discomfort the animal experiences from wearing a wellness and training device.

BACKGROUND

Approximately 70% of American households own a pet as of 2022, and, as such, human training and maintenance of animals has become a common daily occurrence. Animals such as dogs, cats, horses, and others, are increasingly interacting with humans and other pets, necessitating the developments of devices to improve their safety, training, and comfort.

While not necessarily limited to dogs, statistics related to pet dogs particularly highlight the necessity and improvements inherent in the animal wellness and training device disclosed herein. Although domesticated, dogs and other pets often bite and injure other creatures or objects. Every year, around 4.5 million people are bitten by dogs in the United States, with 800,000 of those bites requiring medical attention. Compounding this problem, dogs, for example, are prone to bite other pets, especially when feeling threatened, left alone, or not closely supervised by their owners.

The close proximity between human and animal life also brings another danger to pets of all species. This additional danger is the possibility that the animal will ingest a harmful substance or object. Dogs again illustrate this problem. Over 200,000 incidents of dogs choking occur annually in the United States, costing dog owners significant emotional stress and veterinarian fees in addition to the harm done to the animal.

Many opportunities arise that can create the risk for an animal to ingest a harmful substance. In household, urban, or rural environments, animals often roam unsupervised or outside the supervision of their owners. In some instances, a pet may be left alone in a household's yard, allowed to wander unrestrained at a park, or pass through a left-open entryway before freely wandering in a neighborhood or unsupervised area. In these cases and more, pets risk ingesting objects that cause choking, poisoning, or disease.

When left alone, pets and domestic animals are also prone to damage furniture, structures, and other objects by biting or gnawing on them. The damage caused by an animal biting at such objects may cause financial cost to pet owners and physical injury to the animal.

Some devices have attempted to alleviate these risks. For example, muzzles such as those disclosed in United States Patent Publication No. US 2020/0337270 and referenced therein attempt to prevent animals from biting or ingesting foreign substances by covering the exterior of the snout with a restrictive binding.

However, these disclosures suffer from a variety of drawbacks. External muzzles, training devices, and wellbeing devices often fit uncomfortably on an animal, which leads to distress, misbehavior, and unwillingness of the animal to wear the device. Signs of distress can be seen, for example, in dogs that snarl, whine, or growl when confined in an exterior, over-the-snout muzzle.

Uncomfortable and ineffective exterior devices also prevent animals from opening their jaws to any degree, causing the animal to feel restrained and defenseless. The restrictive nature of exterior training and wellness devices thus adds to the animal's discomfort and the owner's difficulty in training and ensuring the animal's wellbeing.

SUMMARY OF THE INVENTION

Arrangements described herein relate generally to an improved device for animal training and wellbeing and a method for making the same. More specifically, arrangements of a device according to the present disclosure include a wellness and training device to be placed inside the mouth of an animal rather than solely over and around the animal's snout.

In one embodiment, the device comprises an upper barrier and a lower barrier. The upper barrier has a top surface configured to comfortably abut the roof of the animal's mouth or be otherwise positioned hear the roof of the animals mouth. In some embodiments, the upper barrier may be supported or held in position by portions of the upper barrier being in contact with the animal's teeth. Likewise, the lower barrier has a bottom surface configured to comfortably abut the floor of the animal's mouth and the animal's tongue or be otherwise positioned hear the floor of the animals mouth and tongue. In some embodiments, the lower barrier may be supported or held in position by portions of the lower barrier being in contact with the animal's teeth. A frame extends laterally between the upper barrier and the lower barrier and connects them together. Additionally, an expansion member placed within the device comprises a first end coupled with the upper barrier and a second end coupled with the lower barrier. In this way, the expansion member urges the upper barrier away from the lower barrier and vice versa such that, when placed inside the mouth of an animal, the top surface of the upper barrier and bottom surface of the lower barrier stay engaged with the roof and floor of the animal's mouth, respectively. A breathable barrier extending between at least a portion of the upper barrier and at least a portion of the lower barrier allows the passage of air through the device so the animal may comfortably breathe through its mouth.

According to another embodiment, the upper barrier and lower barrier of the pet wellness and training device may be integrally formed. When integrally formed, the upper barrier and lower barrier may be part of the same unified structure, but may be folded, constructed, or maneuvered such that the upper barrier is configured to have a top surface that comfortably abuts the roof of the animal's mouth or be otherwise positioned near the roof of the animal's mouth, while the lower barrier is configured to have a bottom surface that comfortably abuts the floor of the animal's mouth and the animal's tongue or be otherwise positioned near the floor of the animal's mouth and tongue. In some embodiments, the upper barrier or the lower barrier may be supported or held in position by portions of the barriers being in contact with the animal's teeth. A first end of at least one expansion member is coupled with the upper barrier and a second end of the at least one expansion member is coupled with the lower barrier. In this way, at least one expansion member is configured to urge the upper barrier away from the lower barrier such that the device presses and forms to the shape of an animal's mouth when placed inside the mouth. A frame and breathable barrier are connected to the integrally formed upper barrier and lower barrier to prevent the animal from ingesting foreign substances while allowing the animal to comfortably breathe through its mouth.

Another embodiment of the pet wellness and training device includes a flexible barrier rather than an upper barrier and a lower barrier. The flexible barrier is configured to fit inside the mouth of an animal and further comprises an upper portion that abuts the roof of an animal's mouth or may otherwise be positioned near the roof of the animal's mouth, and a lower portion that abuts the floor and tongue of the animal's mouth or may otherwise be positioned near the floor of the animal's mouth and tongue. In some embodiments, the upper barrier or the lower barrier may be supported or held in position by portions of the barriers being in contact with the animal's teeth. At least one frame extends laterally and connects the upper portion of the flexible barrier to the lower portion of the flexible barrier. A breathable barrier disposed at least partially between the upper portion of the flexible barrier and the lower portion of the flexible barrier allows air to flow through the device such that the animal may breathe while the device is operatively placed inside its mouth. Further, at least one expansion member with a first end coupled to the upper portion of the flexible barrier and a second end coupled to the lower portion of the flexible barrier urges the upper portion away from the lower portion and vice versa. In doing so, the at least one expansion member keeps the device snuggly abutting the roof and floor of the animal's mouth or the animal's teeth regardless of the degree the animal opens or closes its jaws.

The embodiments described above as well as other embodiments may include a means for securing the wellness and training device inside the mouth of the animal. In addition to further examples disclosed herein, some means for securing the pet training and wellness device may include an elastic band connected to the frame, a Velcro® strap connected to the device, or a leather harness connected to the device, all being configured to wrap around the animal's neck, snout, or to attach to a collar or harness to secure the pet training and wellness device inside the mouth of the animal. Other means for securing the pet wellness and training device are discussed hereafter in connection with the appended drawings.

The embodiments described above and other embodiments may also include perforations in the frame to increase the airflow through the device. In addition to examples of perforations discussed herein in connection with the drawings, such perforations may include gaps inserted in the frame, slits cut into the frame, valves inserted into the frame, or gaps inserted in the frame covered by a mesh or grate.

Additionally, the embodiments described above and other embodiments may also include a recess along the bottom of the device such that an animal's tongue can comfortably fit within the recess while the device is operatively secured inside the mouth of the animal.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
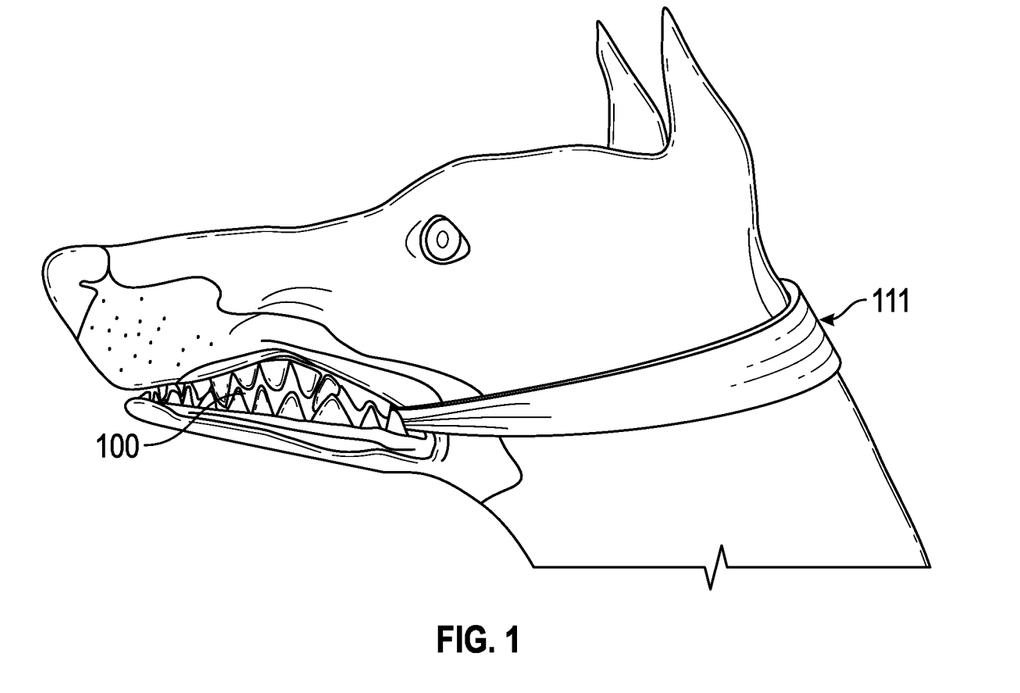
FIG. 1 is a perspective view showing an embodiment of the present pet wellness and training device in its operative position in the mouth of an animal, here a canine.

Referring to FIG. 1, a pet wellness and training device 100 constructed according to the disclosure herein is shown in its operative location inside a mouth of an animal, in this case the mouth of a canine. For illustrative purposes, one possible means for securing the wellness and training device inside the mouth of the animal 111, an elastic band, is also shown holding the pet wellness and training device 100 in its operative position. While FIG. 1 shows the pet wellness and training device 100 in its operative position within the mouth of a canine, it is understood that the device may be used with any animal with elongated jaws or a snout. For example, such animals may include cats, dogs, horses, ferrets, pigs, otters, raccoons, etc.

Figure 2:
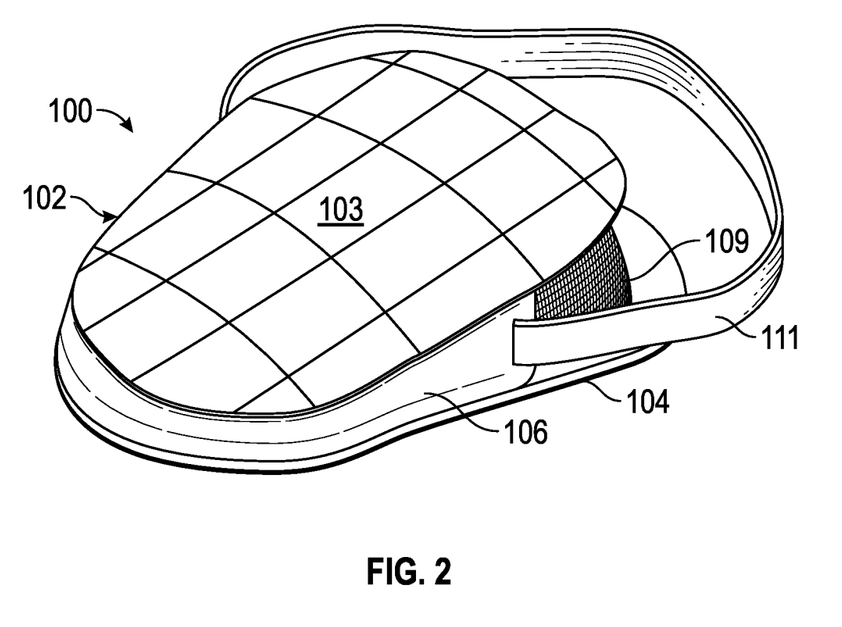
FIG. 2 is a perspective view the pet wellness and training device with an upper barrier and a lower barrier according to an exemplary embodiment of the present disclosure.

Turning to FIG. 2, an exemplary embodiment of a pet wellness and training device 100 intended to be placed inside a mouth of an animal according to the present disclosure is shown. The pet wellness and training device 100 comprises an upper barrier 102 having at least a top surface 103 configured to be disposed at least partially adjacent to a roof of an animal's mouth. The upper barrier 102 is connected to a frame 106 which extends horizontally and generally follows the outline of the animal's snout. The frame 106 is also connected to a lower barrier 104 which has a bottom surface 105 (not shown in FIG. 2) configured to be disposed at least partially adjacent to a floor of the animal's mouth. In some embodiments, the frame 106 may be contoured or otherwise configured to comfortably fit against, over, or along one or more sets of teeth of the animal. In some embodiments, the upper barrier 102 and/or the lower barrier 104 may be contoured or otherwise configured to comfortably fit against, over, or along one or more sets of teeth of the animal. The pet wellness and training device 100 also comprises a breathable barrier 109 that extends between at least a portion of the upper barrier 102 and at least a portion of the lower barrier 104. The breathable barrier 109 may also be connected to the frame 106 such that the breathable barrier 109 and frame 106 enclose the space defined between the upper barrier 102 and lower barrier 104 while allowing air to flow through or around the pet wellness and training device 100.

Figure 3:
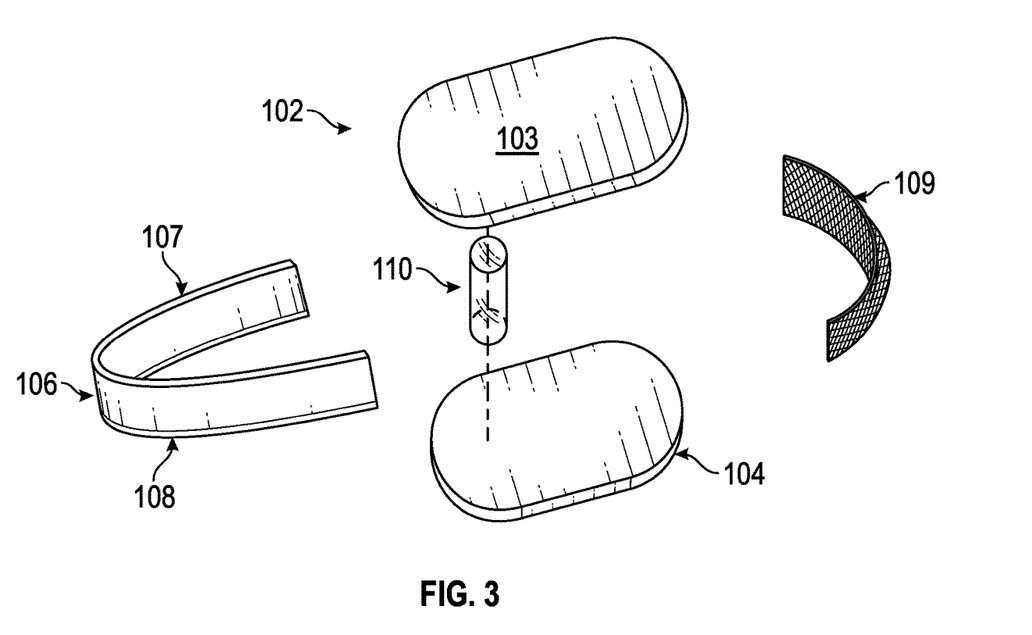
FIG. 3 is an exploded view of the pet wellness and training device according to the exemplary embodiment of FIG. 2, showing the components of the pet wellness and training device, excluding a means for securing the wellness and training device inside the mouth of the animal.

FIG. 3. illustrates an exploded view of the embodiment of the pet wellness and training device 100 shown in FIG. 2 (excluding a means for securing the wellness and training device in the mouth of the animal 111) to further demonstrate possible arrangements of the device's components. This view illustrates an upper barrier 102 with a top surface 103 configured to be disposed at least partially adjacent to a roof of an animal's mouth. Likewise, a lower barrier 104 is included with a bottom surface 105 (not shown) that is configured to be disposed at least partially adjacent to a floor and/or tongue of the animal's mouth.

The frame 106 is shown separated from the upper barrier 102 and lower barrier 104, and a first portion 107 of the frame and a second portion 108 of the frame are visible. In the assembled state of the pet wellness and training device 100, the first portion 107 of the frame is connected to the upper barrier 102. Likewise, the second portion 108 of the frame is connected to the lower barrier 104. A large variety of possible connections are available. For example, the frame 106 may be connected to the upper barrier 102 by sewing the two together at the first portion 107 of the frame 106, by using an adhesive to join the two together at the first portion 107 of the frame 106, by fusing the two together at the first portion 107 of the frame 106, or any other commonly used method of joining two surfaces. These same methods may be used to connect the frame 106 to the lower barrier 104 at the second portion 108 of the frame 106. The method used to connect the frame 106 to the upper barrier 102 may be the same method or a different method than that used to connect the frame 106 to the lower barrier 104.

Also shown in FIG. 3 is at least one expansion member 110 configured to urge the upper barrier 102 away from the lower barrier 104, said at least one expansion member 110 also configured to urge the lower barrier 104 away from the upper barrier 102. The at least one expansion member 110 can be formed with various materials and fabricated to urge the upper barrier 102 and lower barrier 104 away from each other in a variety of ways. For example, the at least one expansion member can be a single or group of compression springs. When outside an animal's mouth, the compression springs push the upper barrier 102 and lower barrier 104 apart, stretching or extending the frame 106. The upper barrier 102 and lower barrier 104 can be urged together, compressing the compression spring before placing the pet wellness and training device 100 inside the animal's mouth. The compression spring or springs then push the upper barrier 102 and lower barrier 104 apart, engaging the top surface 103 with at least a portion of a roof of the animal's mouth and engaging the bottom surface 105 with at least a portion of a floor and/or tongue of the animal's mouth. Alternatively, a portion of the top surface 103 of the upper barrier 102 may engage with one or more of the animal's teeth, and the bottom surface 105 of the lower barrier 104 may engage with one or more of the animal's teeth, thereby reducing the pressure directed to the roof and floor or tongue of the animal's mouth. In this way, the wellness and training device 100 snuggly forms to the shape of the animal's mouth regardless of how narrow or wide the animal opens its jaws.

The at least one expansion member 110 may take on additional forms. For example, the at least one expansion member 110 may be a torsion spring(s), gas spring(s), closed cavity or cavities of a compressible substance, or member(s) of a compressible material—such as foam, rubber, or soft plastic—that are biased to return to an expanded unloaded state when not experiencing compression.

A breathable barrier 109 is also included and extends between at least a portion of the upper barrier 102 and at least a portion of the lower barrier 104. A variety of materials and structures may serve as the breathable barrier 109. For example, the breathable barrier 109 may be a mesh film made of cloth, twine, rope, plastic, nylon, polymer, natural fibers, latex, rubber, elastic, or other suitable materials. Other embodiments may include a breathable barrier 109 in the form of a perforated film, or a flexible barrier with valves, slits, or gaps therein. In some embodiments, the breathable barrier 109 may be connected to the frame 106. This connection may be accomplished by any suitable technique known in the art including but not limited to: mechanically connecting the two pieces (e.g., tongue in groove, slots with widened tabs, receivers with tapered pins, etc.), sewing the two pieces together, applying an adhesive to join the two pieces together, chemical or electronic welding, or by fusing the two pieces together with heat or compression.

Figure 4A:
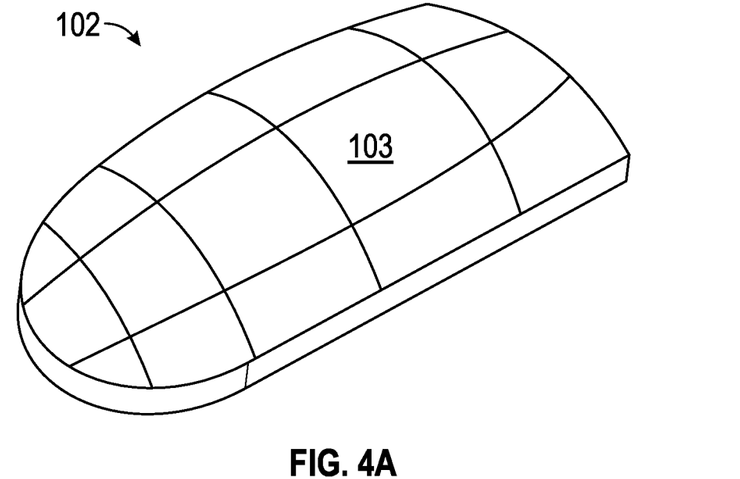
FIGS. 4(a) and 4(b) are perspective views of an upper barrier (a) and a lower barrier (b) of a pet wellness and training device according to an exemplary embodiment as disclosed herein.
Figure 4B:
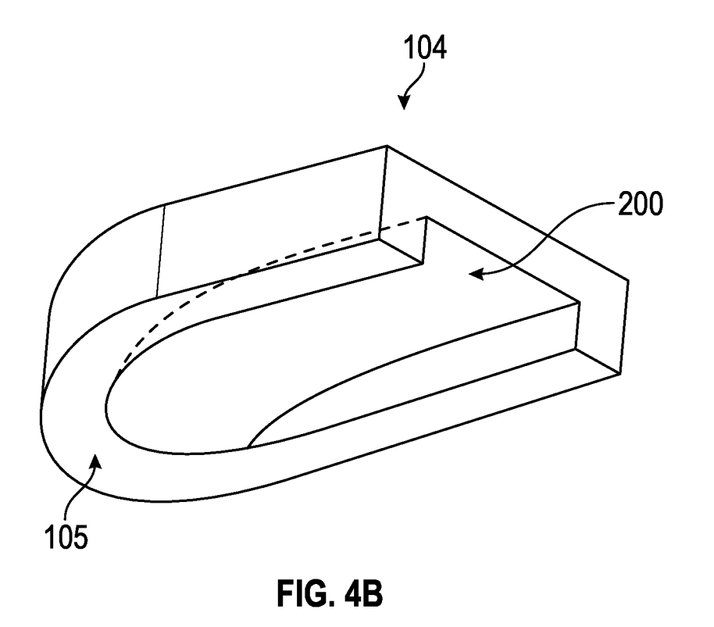

Turning to FIG. 4, various embodiments of the upper barrier 102 and lower barrier 104 are disclosed such that the pet wellness and training device 100 may fit comfortably in the mouth and jaws of an animal. FIG. 4a illustrates one possible embodiment of the upper barrier 102 having a top surface 103 configured to be disposed at least partially adjacent to a roof of the animal's mouth or configured to engage with one or more of the animal's teeth. The upper barrier 102 may be made of any suitable non-toxic material, such as but not limited to: non-toxic rubber, silicone, leather, non-toxic plastic, polyethylene, polyethylene terephthalate polypropylene, polyvinyl chloride, acrylic, polycarbonate, natural fibers, cotton, hemp, nylon, latex, or combinations thereof. Similarly, the top surface 103 may be made of one or more combinations of these materials or other materials suitable to comfortably abut or be positioned near the roof of the animal's mouth. The top surface 103 may be contoured to fit against the roof of the animal's mouth without discomfort and without causing irritation at any points of contact. For example, the top surface 103 may include curved or padded segments with channels that allow air and saliva to pass over the top of the pet wellness and training device 100 or may be shaped to mimic the geometry of the roof of the animal's mouth.

As shown in FIG. 4b, various embodiments of the lower barrier 104 are also disclosed. The lower barrier 104 includes a bottom surface 105 configured to be disposed at least partially adjacent to a floor of the animal's mouth or to engage with one or more of the animal's teeth. The lower barrier 104 may be made of any suitable non-toxic material, including but not limited to: non-toxic rubber, silicone, leather, non-toxic plastic, polyethylene, polyethylene terephthalate polypropylene, polyvinyl chloride, acrylic, polycarbonate, natural fibers, cotton, hemp, nylon, latex, or combinations thereof. Similarly, the bottom surface 105 may be made of one or more combinations of these materials or other materials suitable to comfortably abut or be positioned near the floor of the animal's mouth. The bottom surface 105 may further be contoured to abut or otherwise contact the floor of an animal's mouth without causing discomfort or irritation. For example, the bottom surface 105 may be sloped, curved, padded, or include ridges to allow air and saliva to flow along the bottom surface 105 while the pet wellness and training device 100 is secured in its operative position inside the mouth of the animal. The bottom surface 105 may also be formed to mimic the geometry of the floor of the animal's mouth.

The lower barrier 104 may also include a recess 200 that defines a space for an animal's tongue to be placed while the pet training and wellness device 100 is fixed in its operative location inside the animal's mouth. The recess may include a curved or rounded top and walls such that, when the pet wellness and training device 100 is in its operative position and the bottom surface 105 of the lower barrier 104 is at least partially adjacent to a floor of the animal's mouth, the animal's tongue is not uncomfortably pinned or pressed beneath the bottom surface 105 and may comfortably rest inside the recess 200.

Figure 5A:
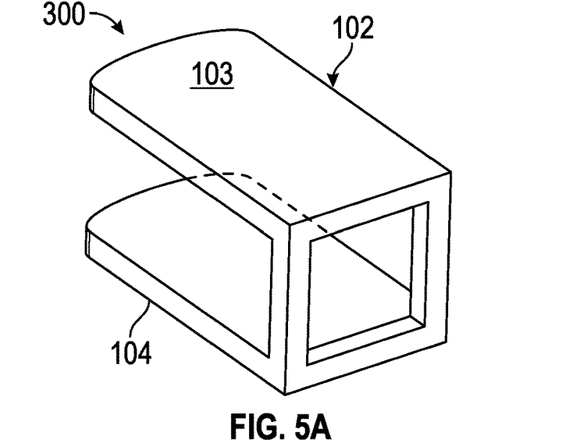
FIGS. 5(a), (b), and (c) are perspective views of showing embodiments of an integrally formed upper barrier and lower barriers of a pet wellness and training device according to an exemplary embodiment as disclosed herein.
Figure 5B:
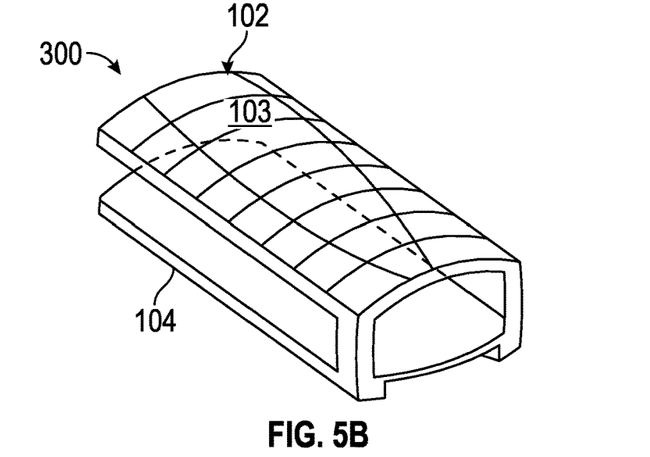
Figure 5C:
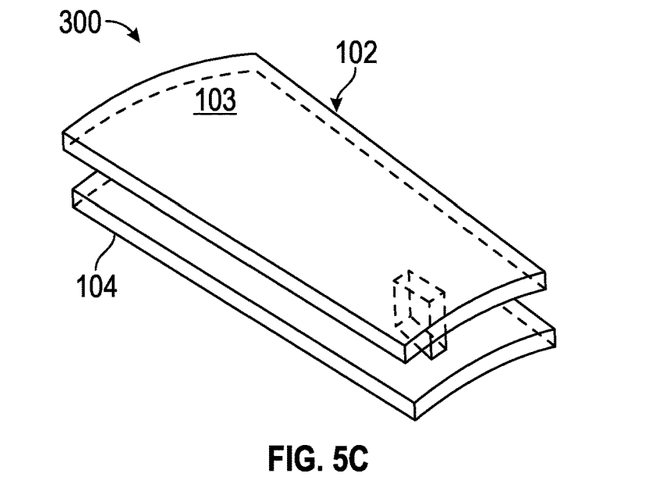

Referring to FIGS. 5a, b, and c, the upper barrier 102 and the lower barrier 104 may be fabricated in many integrally formed configurations 300. FIG. 5a shows an embodiment wherein the upper barrier 102 and lower barrier 104 are integrally formed such that two columns of material extend between and directly connect the upper barrier 102 to the lower barrier 104. FIG. 5b shows an embodiment wherein the upper barrier 102 and the lower barrier 104 are integrally formed via attachment to a rounded end piece. In this embodiments and other embodiments, as discussed above, the top surface 103 of the upper barrier 102 may be textured, padded, or contoured to fit comfortably against a roof of an animal's mouth. Likewise, the lower barrier 104 may include a recess 200 that defines a space for an animal's tongue to rest within while the pet training and wellness device 100 is in its operative position. FIG. 5c shows an embodiment wherein the upper barrier 102 and lower barrier 104 are integrally formed with a member of material joining the internal faces of the upper barrier 102 and lower barrier 104. Such integrally formed configurations 300 may be manufactured in a variety of methods such as injection molding, compression molding, transfer molding, sewing, or connecting the barriers with adhesive.

Figure 6:
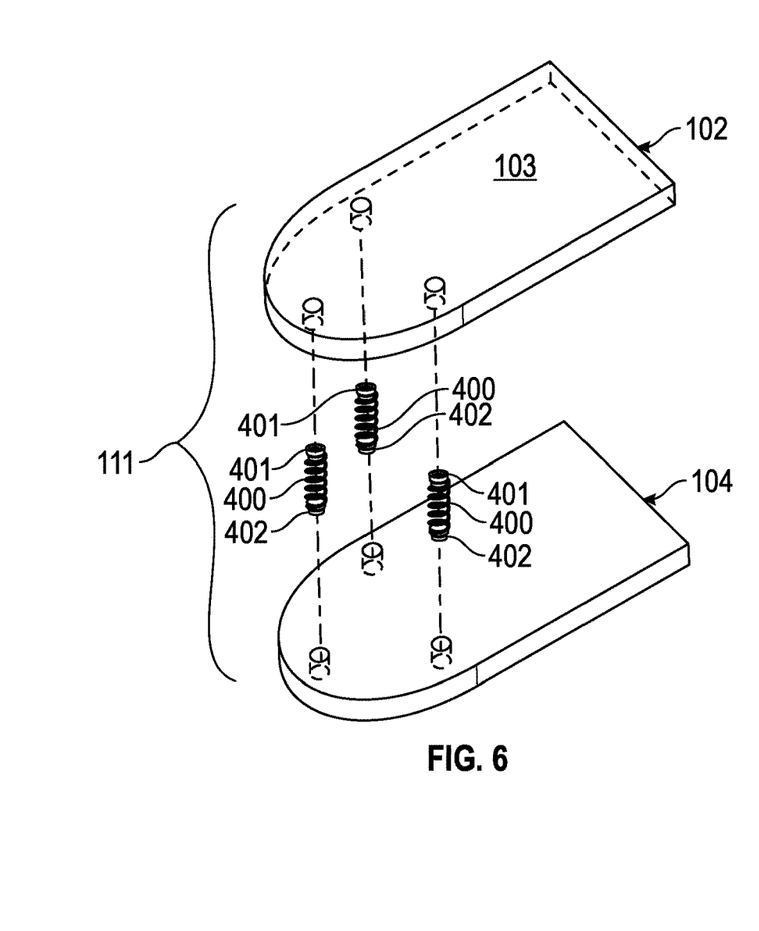
FIG. 6 is a perspective view showing a plurality of springs serving as the at least one expansion member with a first end coupled with the upper barrier and a second end coupled with the lower barrier according to an exemplary embodiment of the present disclosure.

Referring to FIG. 6, in some embodiments, the pet wellness and training device 100 may include at least one expansion member 111 comprising at least one compression spring 400 or a plurality thereof. The at least one compression spring 400 may have a first end 401 coupled with the upper barrier 102 and a second end 402 coupled with the lower barrier 104. Coupling of the first end 401 and the upper barrier 102 may be accomplished by inserting the first end 401 into an indention, notch, tab, or other similar feature in the upper barrier 102, by joining the first end 401 to the upper barrier 102 with an adhesive, welding the first end of the expansion member to the upper barrier, sintering the pieces together, chemically or electrically welding the pieces together, or by allowing the tension of the compression spring 400 to keep the first end 401 held against the upper barrier 102. Similar methods may be used to couple the second end 402 to the lower barrier 104. In an alternative embodiment, the expansion members may be formed of the same material as either the upper or lower barrier and, as such, the expansion member may be integrally formed with the upper or lower barrier. In yet another embodiment, the expansion members may be a single or group of compressible substances—such as foam, soft plastic, rubber, etc.—that are biased to return to an expanded unloaded state when not experiencing compression.

Figure 7A:
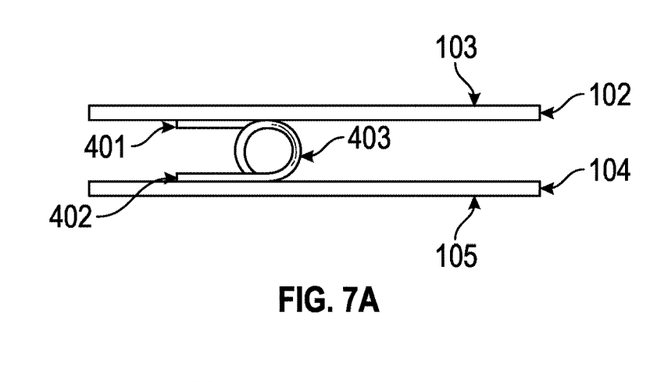
FIGS. 7(a) and (b) are a side view and a perspective view, respectively, showing a different plurality of springs serving as the at least one expansion member with a first end coupled with the upper barrier and a second end coupled with the lower barrier according to an exemplary embodiment of the present disclosure.
Figure 7B:
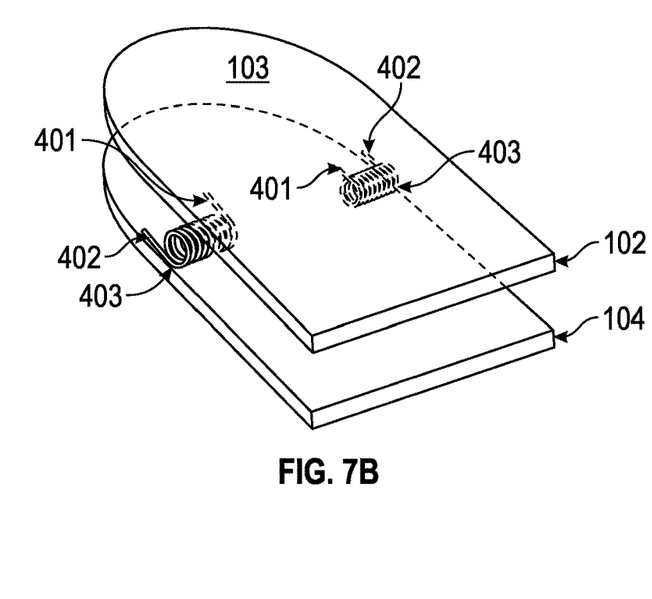

Referring to FIGS. 7a and 7b, the at least one expansion member 111 may also be at least one torsion spring 403 or a plurality thereof. FIG. 7a shows a side view of the components of the pet training and wellness device 100 shown in FIG. 7b. From the side view, the bottom surface 105 of the lower barrier 104 is visible, said bottom surface 105 configured to be placed at least partially adjacent to the floor of an animal's mouth or configured to engage with at least one of the animal's teeth. Similarly, the top surface 103 of the upper barrier 102 is visible, said top surface 103 configured to be placed at least partially adjacent to the roof of an animal's mouth or configured to engage with at least one of the animal's teeth. A torsion spring 403 or a plurality thereof is located between the upper barrier 102 and the lower barrier 104. The torsion spring 403 has a first end 401 coupled to the upper barrier 102 and a second end 402 coupled with the lower barrier 104. The first end 401 may be coupled to the upper barrier 102 by joining the first end 401 to the upper barrier 102 using an adhesive, by inserting the first end 401 into an indentation, notch, tab, or other similar feature in the upper barrier 102, welding the first end 401 of the expansion member to the upper barrier 102, sintering the pieces together, chemically or electrically welding the pieces together, or by allowing the tension of the torsion spring 403 to keep the first end 401 held against the upper barrier 102. Similar methods may be used to couple the second end 402 to the lower barrier 104.

When the pet wellness and training device including the components shown in FIGS. 7a and 7b is in its operative state, the torsion spring 403 is rotated away from its resting position. In this way, the torsion spring asserts a rotational force on the upper barrier 102 and lower barrier 104 that urges the two apart as the torsion spring attempts to return to its resting position. The force of the torsion spring thus keeps the upper barrier 102 and the lower barrier 104 snuggly in place and pressed against the teeth and/or the roof and floor of an animal's mouth, respectively. The pet wellness and training device 100 may include any variation of compression, torsion, and/or gas springs or other expansion members as necessary.

Figure 8:
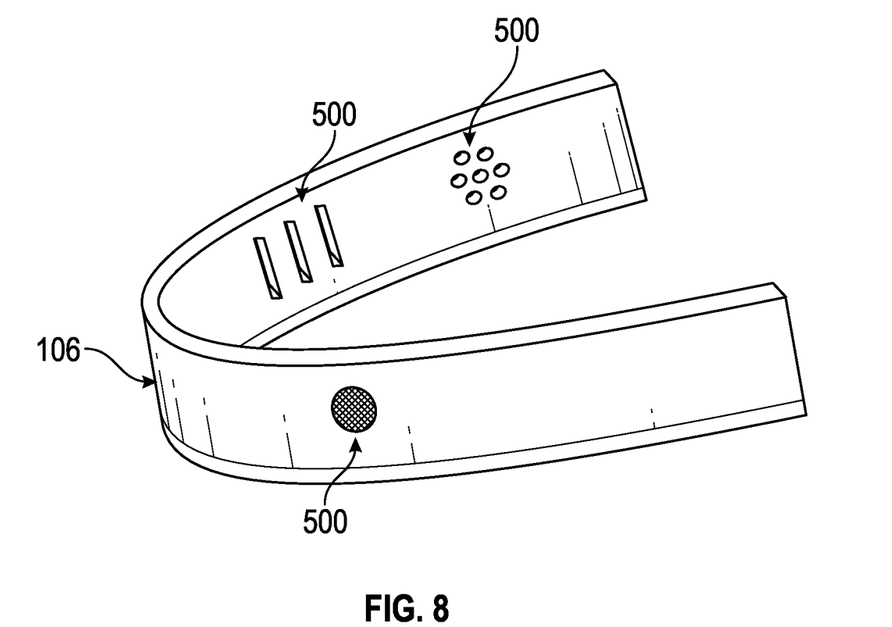
FIG. 8 is a perspective view of a frame showing multiple styles of perforations according to various embodiments of the present invention.

Referring to FIG. 8, the frame 106 of the pet wellness and training device 100 may be formed from various materials. These materials include non-toxic rubber, silicone, leather, non-toxic plastic, polyethylene, polyethylene terephthalate polypropylene, polyvinyl chloride, acrylic, polycarbonate, natural fibers, cotton, hemp, nylon, latex, elastic, foam, or combinations thereof. Preferably, the frame 106 is made of an expandable material, including expandable materials from those previously discussed such as non-toxic rubber, silicone, nylon, latex, elastic, or combinations thereof. Further, the frame 106 may include perforations 500 which increase the flow of air through the pet wellness and training device 100 and improve the animal's ability to breathe while wearing the device. Such perforations 500 may include individual holes, groups of holes, slits, groups of slits, openings covered by breathable mesh, valves, and other such openings that allow airflow without compromising the structural integrity or flexibility of the frame.

Figure 9:
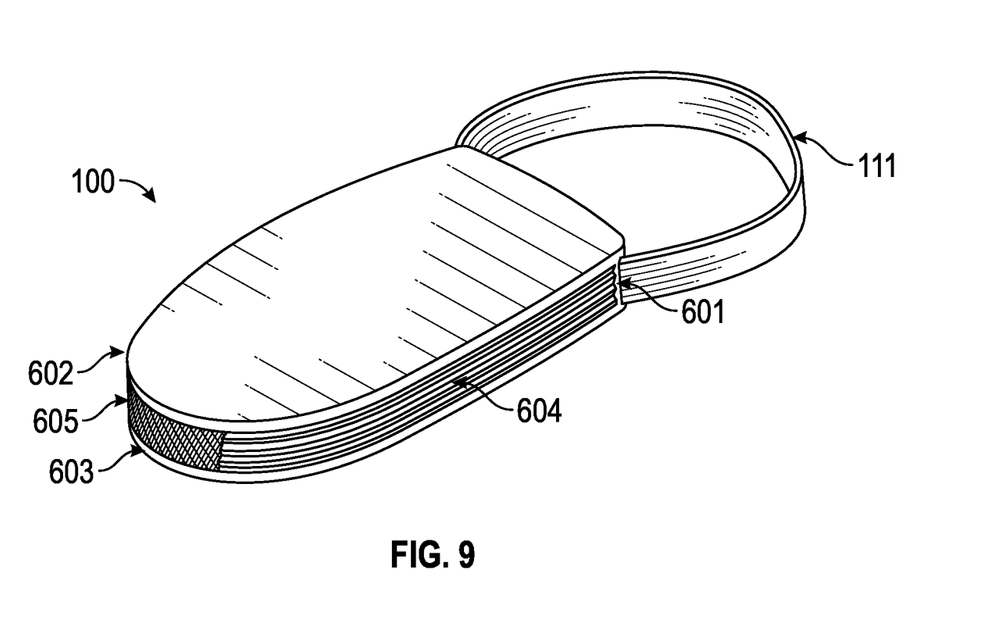
FIG. 9 is a perspective view a pet wellness and training device with a flexible barrier according to one embodiment of the present disclosure.

Referring to FIG. 9, the wellness and training device 100 may also comprise a single flexible barrier 601, said flexible barrier 601 having an upper portion 602 configured to be disposed at least partially adjacent to a roof of the animal's mouth, and a lower portion 603 configured to be disposed at least partially adjacent to a floor of the animal's mouth. In some embodiments, the upper portion 602 and/or the lower portion 603 may be supported or held in position by portions of the barrier being in contact with the animal's teeth. The flexible barrier 601 may be formed from various materials including non-toxic rubber, silicone, leather, non-toxic plastic, polyethylene, polyethylene terephthalate polypropylene, polyvinyl chloride, acrylic, polycarbonate, natural fibers, cotton, hemp, nylon, latex, foam, or combinations thereof.

Like above, the lower portion 603 may include a recess along its bottom surface such that the cavity of the recess forms a space around the animal's tongue when the pet wellness and training device 100 rests in its operative position inside the animal's mouth. While the bottom surface of the lower portion 603 rests at least partially adjacent to the floor of the animal's mouth, the recess in the lower portion 603 provides space for the animal's tongue such that it is not pinned or compressed beneath the pet wellness and training device 100.

The pet wellness and training device 100 may also have at least one frame 604 disposed between the upper portion 602 of the flexible barrier 601 and the lower portion 603 of the flexible barrier 601. The at least one frame 604 may be made from a variety of materials capable of stretching or deforming to adjust to the degree that the animal opens its jaws. For example, the at least one frame 604 is may be made of an expandable material such as elastic, elastic film, flexible rubber, silicone, soft plastic, nylon, latex, natural fibers, or combinations thereof. The at least one frame 604 may also be made of a folded sheet of less flexible material like leather, plastic, cotton, hemp, foam, polyethylene, polyethylene terephthalate polypropylene, polyvinyl chloride, acrylic, and polycarbonate. In such an embodiment, the at least one frame 604 acts like the folded air reservoir of a bellows, able to expand and unfold when the animal's mouth is open and able to fold back in on itself and collapse when the animal's mouth is closed.

The at least one frame 604 may be perforated and include perforations like those discussed above which increase the flow of air through the pet wellness and training device 100 and improve the animal's ability to breathe through its mouth while wearing the device. Such perforations can include individual holes, groups of holes, slits, groups of slits, openings covered by breathable mesh, valves, and other such openings that allow airflow without compromising the structural integrity or flexibility of the frame.

The at least one frame may also include a first portion connected to the upper portion 602 of the flexible barrier 601 and a second portion connected to the lower portion 603 of the flexible barrier 601. The at least one frame 604 may be connected to the upper portion 602 by sewing the two together at the first portion of the at least one frame 604, by using an adhesive to join the two together at the first portion of the at least one frame 604, by fusing the two together at the first portion of the at least one frame 604, by welding the pieces together, sintering the pieces together, chemically or electrically welding the pieces together, or any other commonly used method of joining two surfaces. Similar methods may be used to join the second portion of the at least one frame 604 to the lower portion 603 of the flexible barrier 601.

Further, at least one breathable barrier 605 may be disposed at least partially between the upper portion 602 of the flexible barrier 601 and the lower portion 603 of the flexible barrier 601. The at least one breathable barrier 605 may be placed or spaced apart in a variety of configurations. For example, in FIG. 9, the at least one breathable barrier 605 is a single breathable barrier placed at the front of the pet wellness and training device 100. However, other acceptable configurations include placing one breathable barrier at the front and a second at the back, placing three breathable barriers—one at the front, one at the left side, and one at the right side of the pet wellness and training device 100—or any other formation of barriers in combination with at least one frame 604. The at least one breathable barrier 605 may be made of a variety of materials. For example, the at least one breathable barrier may comprise a mesh of cloth, twine, rope, plastic, nylon, polymer, natural fibers, latex, rubber, elastic, or other suitable materials that is connected to the at least one frame 604. Other embodiments may include at least one breathable barrier 605 in the form of a perforated film, or a flexible barrier with valves, slits, or gaps therein, a grid of elastic material, a weave of rubber material, strips of nylon, or combinations thereof.

The pet wellness and training device 100 shown in FIG. 9 also includes at least one expansion member configured to urge the upper portion 602 of the flexible barrier 601 away from the lower portion 603 of the flexible barrier 601 and vice versa. Like the embodiments described above, the at least one expansion member may comprise at least one compression spring. The at least one compression spring may have a first end coupled with the upper portion 602 of the flexible barrier 601 and a second end coupled with the lower portion 603 of the flexible barrier 601. Coupling of the first end and the upper portion 602 may be accomplished by inserting the first end into an indentation, notch, tab, or other similar feature in the upper portion 602, welding the first end of the at least one expansion member to the upper portion 602, sintering the pieces together, chemically or electrically welding the pieces together in the upper portion 602, by joining the first end to the upper portion 602 with an adhesive, or by allowing the tension of the compression spring to keep the first end held against the upper portion 602. Similar methods may be used to couple the second end to the lower portion 603.

The at least one expansion member may also be a torsion spring or a plurality thereof located between the upper portion 602 and the lower portion 603 of the flexible barrier

601. The torsion spring has a first end coupled to the upper portion 602 and a second end coupled with the lower portion 603. The first end may be coupled to the upper portion 602 by joining the first end to the upper portion 602 using an adhesive, by inserting the first end into an indentation, notch, tab, slot, or other similar structure formed in the interior surface of a upper portion 602, welding the first end of the at least one expansion member to the upper portion 602, sintering the pieces together, chemically or electrically welding the pieces together in the upper portion 602, or by allowing the tension of the torsion spring to keep the first end held against the upper portion 602. Similar methods may be used to couple the second end to the lower portion 603.

The pet wellness and training device 100 as disclosed herein may also include a means for securing the wellness and training device 111 inside the mouth of the animal. The means for securing the wellness and training device 111 may include a strap configured to wrap around the neck, snout, or head of an animal with Velcro fasteners at either end to hold the strap in place once pulled taught and joined together. Further, the device may be secured in place by using any known configuration of a leash, collar, or harness assembly, such as a leather strap with a buckle and a loop, said leather strap including a plurality of holes. The leather strap may be wound around the neck or head of the animal, fed through the buckle and loop, and fastened in place by inserting a metal rod of the buckle into one of the plurality of holes on the leather strap. Other means for securing the device in place include loops of cordage configured to fasten around the animal's neck or to fasten onto a collar worn by the animal, at least one elastic band configured to loop around the neck of the animal, or a first strap with a male buckle and a second strap with a female buckle, said first strap and second strap configured to loop around the neck or head of an animal such that the male buckle and female buckle connect together and snuggly secure the device in place.

Also disclosed herein is the process of making the pet wellness and training device 100. Said process comprises the steps of providing an upper barrier 102, said upper barrier 102 configured to contact at least a portion of a roof of the animal's mouth or at least one tooth of the animal; providing a lower barrier 104, said lower barrier 104 configured to contact at least a portion of a floor of the animal's mouth or at least one tooth of the animal; connecting the upper barrier 104 to a first portion 107 of a frame 106, said frame 106 configured to be disposed between the upper barrier 102 and the lower barrier 104; connecting the lower barrier 104 to a second portion 108 of the frame 106; connecting the upper barrier 102 to a top end of an at least one expansion member 110; connecting the lower barrier 104 to a bottom end of the at least one expansion member 110, said at least one expansion member 110 configured to urge the lower barrier 104 away from the upper barrier 102 such that an aperture is defined between at least a portion of the upper barrier 102 and at least a portion of the lower barrier 104; and connecting a breathable barrier 109 to at least a portion of the upper barrier 102 and at least a portion of the lower barrier 104 such that the breathable barrier 109 extends across at least a portion of the aperture defined between the upper barrier 102 and the lower barrier 104.

While the present invention has been described in connection with the exemplary embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or movable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X; Y; Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A wellness and training device for an animal to be placed in a mouth of the animal, the device comprising:
   an upper barrier having at least a top surface, the top surface configured to be disposed at least partially adjacent to a roof of the animal's mouth;

a lower barrier having at least a bottom surface, the bottom surface configured to be disposed at least partially adjacent to a floor of the animal's mouth;

a frame disposed between the upper barrier and the lower barrier, said frame including a first portion connected to the upper barrier and a second portion connected to the lower barrier;

a breathable barrier extending between at least a portion of the upper barrier and at least a portion of the lower barrier;

at least one expansion member configured to urge the upper barrier away from the lower barrier, said at least one expansion member also configured to urge the lower barrier away from the upper barrier; and a strap coupled to the frame and configured to secure the wellness and training device inside the mouth of the animal.

2. The wellness and training device of claim 1 wherein at least one of the upper barrier and the lower barrier is made of non-toxic rubber, silicone, leather, non-toxic plastic, polyethylene, polyethylene terephthalate polypropylene, polyvinyl chloride, acrylic, polycarbonate, natural fibers, cotton, hemp, nylon, latex, or combinations thereof.

3. The wellness and training device of claim 1 wherein the upper barrier and the lower barrier are integrally formed.

4. The wellness and training device of claim 1 wherein the bottom surface of the lower barrier further comprises a recess.

5. The wellness and training device of claim 1 wherein the frame is formed from an expandable material.

6. The wellness and training device of claim 1 wherein the frame is perforated.

7. The wellness and training device of claim 1 wherein the breathable barrier comprises a mesh and is connected to the frame.

8. The wellness and training device of claim 1 wherein the at least one expansion member is a spring, said spring having a first end coupled with the upper barrier and a second end coupled with the lower barrier.

9. A wellness and training device for an animal to be placed in a mouth of the animal, the device comprising:

a flexible barrier, said flexible barrier having an upper portion configured to be disposed at least partially adjacent to a roof of the animal's mouth, and a lower portion configured to be disposed at least partially adjacent to a floor of the animal's mouth;

at least one frame disposed between the upper portion of the flexible barrier and the lower portion of the flexible barrier, said at least one frame including a first portion connected to the upper portion of the flexible barrier and a second portion connected to the lower portion of the flexible barrier;

at least one breathable barrier disposed at least partially between the upper portion of the flexible barrier and the lower portion of the flexible barrier;

at least one expansion member configured to urge the upper portion of the flexible barrier away from the lower portion of the flexible barrier, said at least one expansion member also configured to urge the lower portion of the flexible barrier away from the upper portion of the flexible barrier; and a strap, coupled to the at least one frame and configured to secure the wellness and training device inside the mouth of the animal.

10. The wellness and training device of claim 9 wherein the flexible barrier is made of non-toxic rubber, silicone, leather, non-toxic plastic, polyethylene, polyethylene terephthalate polypropylene, polyvinyl chloride, acrylic, polycarbonate, natural fibers, cotton, hemp, nylon, latex, or combinations thereof.

11. The wellness and training device of claim 9 wherein the lower portion of the flexible barrier further comprises a recess along a bottom surface of the lower portion.

12. The wellness and training device of claim 9 wherein the at least one frame is formed from an expandable material.

13. The wellness and training device of claim 9 wherein the at least one frame is perforated.

14. The wellness and training device of claim 9 wherein the at least one breathable barrier comprises a mesh and is connected to the at least one frame.

15. The wellness and training device of claim 9 wherein the at least one expansion member is a spring, said spring having a first end coupled with the upper portion of the flexible barrier and a second end coupled with the lower portion of the flexible barrier.

16. A process of making a wellness and training device for an animal to be placed in a mouth of the animal, comprising the steps of:

providing an upper barrier, said upper barrier configured to contact at least a portion of a roof of the animal's mouth;

providing a lower barrier, said lower barrier configured to contact at least a portion of a floor of the animal's mouth;

connecting the upper barrier to a first portion of a frame, said frame configured to be disposed between the upper barrier and the lower barrier;

connecting the lower barrier to a second portion of the frame;

connecting the upper barrier to a top end of an at least one expansion member;

connecting the lower barrier to a bottom end of the at least one expansion member, said at least one expansion member configured to urge the lower barrier away from the upper barrier such that an aperture is defined between at least a portion of the upper barrier and at least a portion of the lower barrier; and connecting a breathable barrier to at least a portion of the upper barrier and at least a portion of the lower barrier such that the breathable barrier extends across at least a portion of the aperture defined between the upper barrier and the lower barrier.

17. The wellness and training device of claim 1 wherein the strap is further configured to attach to a leash, collar, or harness assembly.

18. The wellness and training device of claim 9 wherein the strap is further configured to attach to a leash, collar, or harness assembly.

* * * * *